(12) United States Patent
Lenz et al.

(10) Patent No.: US 6,259,847 B1
(45) Date of Patent: Jul. 10, 2001

(54) OPTICAL COMMUNICATION SYSTEM INCLUDING BROADBAND ALL-PASS FILTER FOR DISPERSION COMPENSATION

(75) Inventors: Gadi Lenz, Fanwood; Christi Kay Madsen, South Plainfield; Joseph Shmulovich, Murray Hill, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/287,430

(22) Filed: Apr. 7, 1999

(51) Int. Cl.[7] .............................. G02B 6/24; G02B 6/26; G02B 6/293
(52) U.S. Cl. ........................ 385/131; 385/27; 359/130
(58) Field of Search ........................ 385/131, 27, 30; 359/130, 127, 119, 576

(56) References Cited

U.S. PATENT DOCUMENTS

| 3,948,583 | * | 4/1976 | Tien | 385/14 |
|---|---|---|---|---|
| 5,122,852 | * | 6/1992 | Chan et al. | 385/15 |
| 5,274,720 | * | 12/1993 | Yamamoto | 385/129 |
| 5,333,216 | * | 7/1994 | Sakata et al. | 385/28 |
| 5,581,642 | * | 12/1996 | Deacon et al. | 385/15 |

* cited by examiner

Primary Examiner—Jon Henry
(74) Attorney, Agent, or Firm—Lowenstein Sandler PC

(57) ABSTRACT

In accordance with the invention, an optical all-pass filter comprises a substrate-supported multilayer waveguiding structure comprising a first layer including a waveguiding optical ring resonator, a second layer including an optical grating optically coupled to the ring resonator, and a third layer including a relatively straight waveguide optically coupled to the grating. The waveguide can be made with standard index material matched to an optical communication system, and the ring can be made of higher index material. The grating sandwiched between them provides phase matching between these two index mismatched structures, facilitating efficient power transfer between them.

6 Claims, 2 Drawing Sheets

OPTICAL COMMUNICATION SYSTEM INCLUDING BROADBAND ALL-PASS FILTER FOR DISPERSION COMPENSATION

FIELD OF THE INVENTION

This invention relates to optical fiber communication systems and, in particular, to broadband all-pass filters for compensating dispersion in optical signals transmitted in such systems.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical fiber transmission line for carrying the optical signals and a receiver for detecting the signals and demodulating the information they carry. Increasingly the optical signals are wavelength division multiplexed signals (WDM signals) comprising a plurality of distinct wavelength signal channels.

Dispersion compensating devices are important components of optical communication systems. Chromatic dispersion occurs when signal components of different wavelengths are subject to different propagation delays. Such dispersion can distort a transmitted pulse and deteriorate the information content of a signal channel. Dispersion compensating devices equalize the propagation delays among the different wavelength components and maintain the quality of the transmitted information.

All-pass filters are useful in compensating optical communication systems. An all-pass filter (APF) is a device which substantially equalizes phases among the different wavelength components of a signal with minimal modification of the amplitude response. In principle APFs can correct phase distortion in an optical communication system without adding amplitude distortion.

The present applicants have disclosed an APF suitable for optical communication systems in U.S. patent application Ser. No. 09/183,980 entitled "All-Pass Optical Filter" filed Oct. 30, 1998, which is incorporated herein by reference. An exemplary embodiment of this APF comprises a length of relatively straight optical waveguide coupled to one or more co-planar ring optical resonators. The ring resonators may themselves be coupled to additional ring resonators to form a multiple-stage APF. A light pulse traveling in the straight waveguide couples in part to the ring resonator. After transit around the ring, the coupled light in turn couples back to the waveguide. Interference between light from the resonator and light transmitted on the waveguide produces a frequency dependent time delay that compensates dispersion. The performance of the APF depends primarily on three parameters: 1) the ring radius, 2) the coupling strength between the ring and the waveguide and 3) the number of rings. The ring radius determines the free spectral range (FSR) of the device. The response is periodic in frequency, and the period is the FSR. The coupling strength determines the maximum group delay and the bandwidth of the enhanced delay. And a larger number of rings can generate more delay.

This APF works well for many applications, however with the ever increasing demand for greater bandwidth in communication systems, APFs of even greater bandwidth are desired. Greater bandwidth implies smaller rings. But smaller rings mean a reduced ring radius which reduces waveguiding efficiency. Increasing the relative index of the ring $$\frac{\Delta n}{\bar{n}},$$

where $\Delta n = n_{cladding} - n_{core}$ and $\bar{n} = \frac{1}{2}(n_{cladding} + n_{core})$) ameliorate this loss in efficiency, but increased ring index requires the ring be placed impractically close to the waveguide to achieve the required coupling strength. Accordingly, there is a need for a new APF design to provide dispersion compensation over an increased bandwidth.

SUMMARY OF THE INVENTION

In accordance with the invention, an optical all-pass filter comprises a substrate-supported multilayer waveguiding structure comprising a first layer including a waveguiding optical ring resonator, a second layer including an optical grating optically coupled to the ring resonator, and a third layer including a relatively straight waveguide optically coupled to the grating. The waveguide can be made with standard index material matched to an optical communication system, and the ring can be made of higher index material. The grating sandwiched between them provides phase matching between these two index mismatched structures, facilitating efficient power transfer between them.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1A:
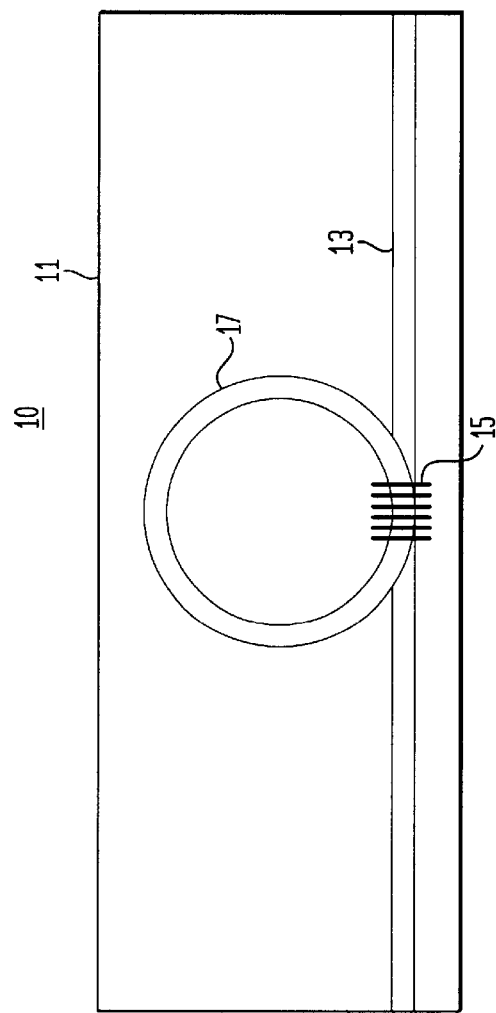
FIGS. 1A and 1B are schematic top and side views of a ring resonator optical all-pass filter in accordance with the invention.
Figure 1B:
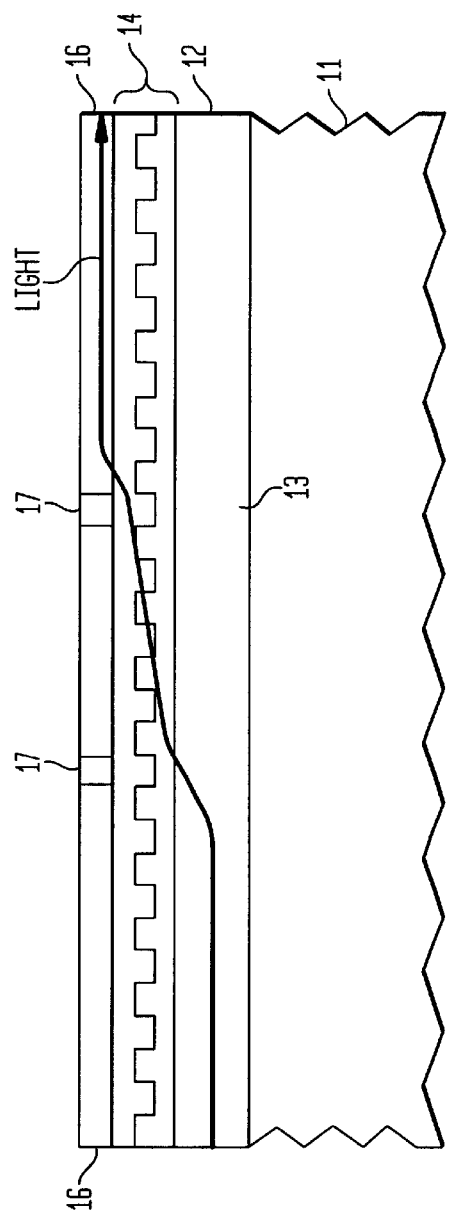

Referring to the drawings, FIGS. 1A and 1B are schematic top and side views respectively of a ring resonator optical all-pass filter 10 comprising a substrate-supported multilayer structure including a substrate 11 and a first layer 12 on the substrate including waveguide 13. A second layer 14 adjacent layer 12 includes an optical grating 15 optically coupled to the waveguide 13, and a third layer 16 adjacent the second layer 14 includes at least one optical waveguiding ring resonator 17 optically coupled to the grating. As compared to the ring resonator 17, the waveguide 13 is relatively straight. The layers can also be reversed in order with the resonator underlying the grating and the straight waveguide on top.

The substrate 11 can be silicon, the first layer 12 can be phosphorous-doped (P-doped) or Ge-doped silica with the waveguide 13 formed of a higher index doped material. The second layer 14 can be P-doped silica with the grating 15 defined as an etched crenelated region within the layer 14. The third layer 16 can be P-doped silica with a ring resonator 17 formed of a high index material such as soda lime glass, alumina or silicon nitride.

For typical communication system applications, the straight waveguide is advantageously made of standard index material (n≈1.46) that provides good match with the system transmission fiber, and the ring is made of high index material (n≧1.60). The grating 15 sandwiched between the ring and the waveguide provides phase matching in the optical path between them and thereby facilitates efficient power transfer.

The period of the grating is advantageously $\lambda/\Delta n_e$, where $\lambda$ is the center wavelength of the transmitted signal and $\Delta n_e$ is the effective index difference between the straight waveguide and the ring. For example, if the index of the ring is 1.6, the index of the waveguide is 1.45, and $\lambda=1.5$ μm, then the grating period is about 10 μm. Gratings with such periods are easily fabricated using standard photolithographic etching techniques.

With the grating in position, the coupling between the mismatched ring and waveguide is no longer critical so that small ring radii (less than 1 mm and even 200 μm or less) and high index differentials ($\Delta n_e \geq 0.15$) can be used. The free spectral range and bandwidth are inversely proportional to the radius. The result is an all-pass filter of enhanced bandwidth as compared to the conventional device (ten times greater bandwidth).

Figure 2:
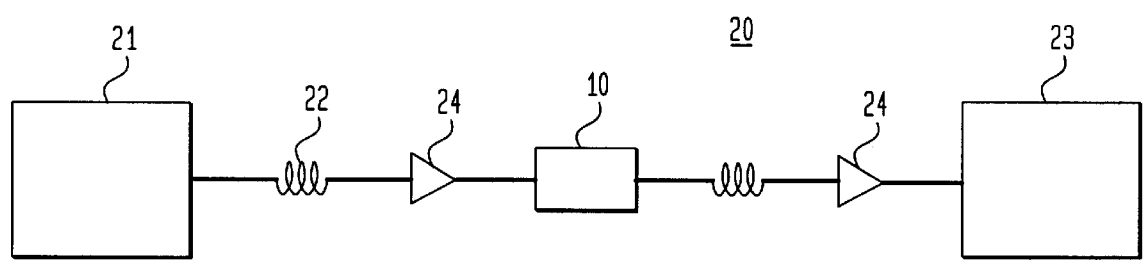
FIG. 2 is a schematic view of an optical communication system employing the filter of FIGS. 1A and 1B.

FIG. 2 schematically illustrates a WDM optical fiber communication system 20 which employs a FIG. 1 device for dispersion compensation. In essence, system 20 comprises a multiwavelength optical transmitter 21, a transmission fiber 22 and a multiwavelength optical receiver 23. Optimally, depending on the length of the system, one or more optical fiber amplifiers 24 can be disposed between segments of the transmission fiber. Advantageously one or more all-pass filters 10 as shown in FIGS. 1A and 1B can be are disposed anywhere needed in the system to reduce dispersion. The straight waveguide sections 17 of each filter 10 are advantageously index matched to the transmission fiber 22.

Another useful application of the FIG. 1 device is as a thermally tunable coupling device. In this instance, the device is made using a hybrid material system consisting of materials with different dn/dT's (temperature-dependent refractive indices). The change in center wavelength $\delta\lambda$ of the long period grating response with temperature is proportional to the change in index $\delta(\Delta n)$ between the two coupled-modes, i.e. $\delta\lambda/\lambda=\delta(\Delta n)/\Delta n$. Consequently, if the device is thermally coupled to a controllable heat source (or sink)(not shown in FIG. 1) a very small change in temperature causes a large change in the response. As an example, consider a glass and a polymer waveguide surrounded by a polymer cladding. The change in index contrast with temperature is proportional to the temperature dependence of the polymer's refractive index since the temperature dependence of the glass is very low by comparison, so $\delta(\Delta n)=\Delta T_{dn^{poly}/dT}$. For $dn^{poly}/dT=-4\times10^{-4}$, $\lambda=1550$ nm, and $\Delta n=0.15$, and $\Delta n=0.15$, the change in center wavelength is 41 nm for a temperature change of 10 degrees Celsius. Thus, the long period grating can be used to couple between waveguides with very different refractive indices and the wavelength dependence of the coupling can be thermally tuned, for example to switch the coupling on and off or vary the coupling strength over a wavelength range of interest.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. An optical all-pass filter comprising:
   a substrate;
   a first layer including at least one optical waveguide ring resonator;
   a second layer including an optical grating optically coupled to the ring resonator; and
   a third layer including a length of optical waveguide optically coupled to the optical grating, said first, second and third layers supported on the substrate.

2. The all-pass filter of claim 1 wherein the first and third layers are adjacent the second layer.

3. The all-pass filter of claim 1 wherein the ring resonator is a circular ring having a radius less than 1 mm.

4. The all-pass filter of claim 1 wherein the ring resonator comprises a loop of waveguide having a refractive index greater than 1.6.

5. An optical communication system comprising:
   a multiwavelength optical transmitter;
   a length of optical transmission fiber for transmitting optical signals from the transmitter, the transmitter fiber subject to chromatic dispersion;
   one or more optical fiber amplifiers disposed between segments of the optical transmission fiber; and
   one or more optical all-pass filters according to claim 1 for compensating the dispersion on the transmission fiber.

6. The all-pass filter of claim 1 further comprising a controllable heat source or heat sink for providing thermally tunable coupling between optical waveguides.

* * * * *